Jan. 13, 1959  R. S. COFFMAN  2,868,412
SAFETY PRESSURE RELIEF DEVICE
Filed April 15, 1954  2 Sheets-Sheet 1

INVENTOR.
Robert S. Coffman
BY
ATTORNEY.

Jan. 13, 1959 R. S. COFFMAN 2,868,412
SAFETY PRESSURE RELIEF DEVICE
Filed April 15, 1954 2 Sheets-Sheet 2
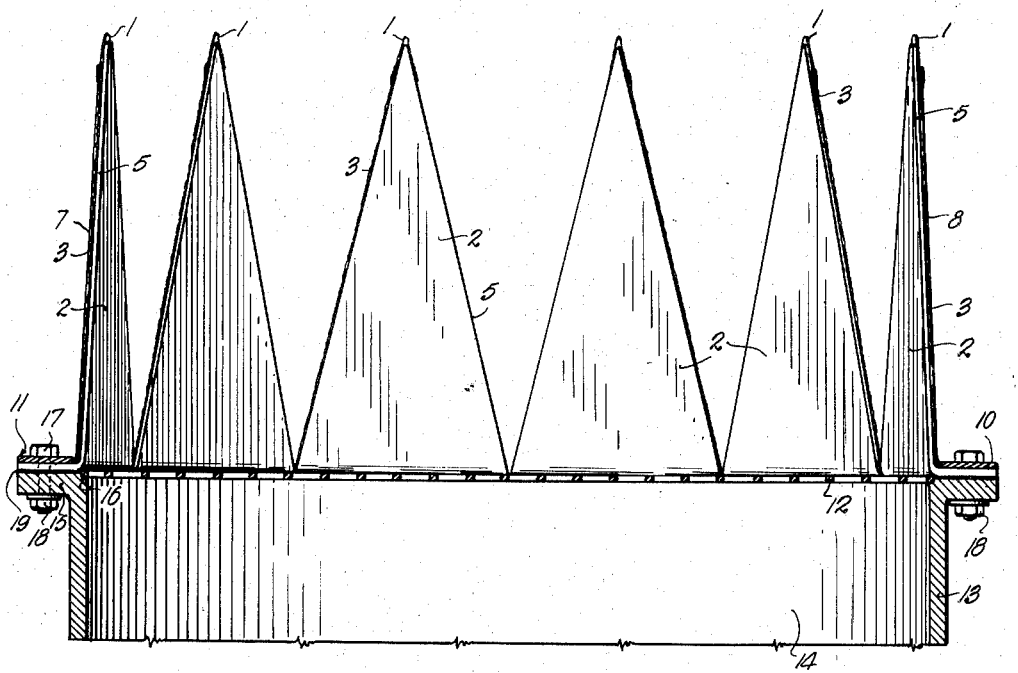
Fig. 4.
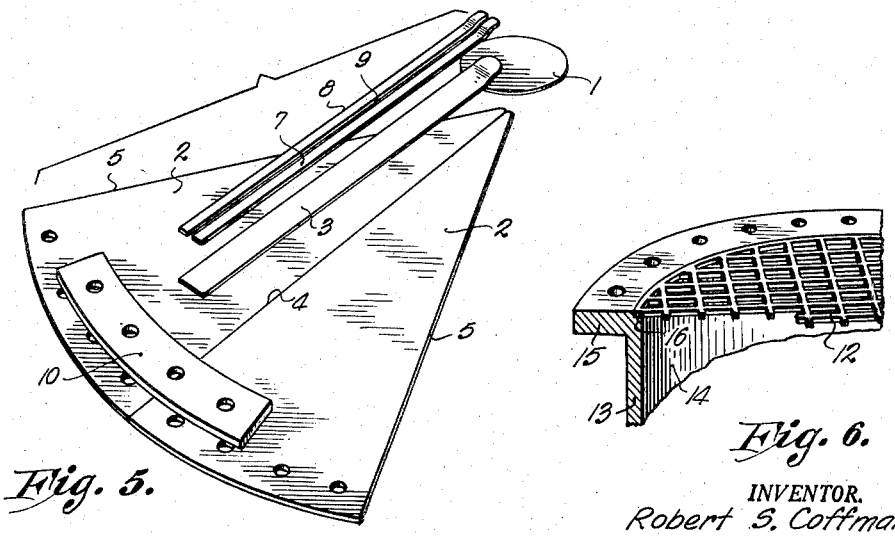
Fig. 5.
Fig. 6.
INVENTOR.
Robert S. Coffman
BY
ATTORNEY.

United States Patent Office 2,868,412
Patented Jan. 13, 1959

2,868,412

SAFETY PRESSURE RELIEF DEVICE

Robert S. Coffman, Kansas City, Mo., assignor to Black, Sivalls & Bryson, Inc., Kansas City, Mo., a corporation of Delaware Application April 15, 1954, Serial No. 423,415

3 Claims. (Cl. 220—89)

This invention relates to safety pressure relief devices used to protect vessels, duct systems and other equipment in which there is a hazard of an extremely rapid pressure increase in the nature and extent of an explosion. This device is particularly designed to be used for the protection of such systems normally operated at atmospheric pressures or less. An example of this type of system or installation in which the present invention may be utilized is an altitude test chamber for turbine or jet motors where a failure in the ignition system would flood the chamber with highly inflammable fuel creating the explosion hazard.

The design of explosion relief devices is complicated by the nature of explosions, that is, the rapid pressure rise and the large relieving area required to prevent excessive pressure increase. The usual type of frangible safety pressure device as disclosed in United States Letters Patent Number 1,930,960 cannot be expected to fulfill the requirements under explosion conditions. The required relief areas are so large, at least twenty-four inches in diameter, and material thickness so thin that the dome-shaped portion would not be self-supporting. The support for such a device would be expensive and difficult to construct so that proper support could be maintained without completely blocking the relief area. The use of the frangible diaphragm also is not feasible because material is not readily available in the sizes required and the tooling needed for the forming of the diaphragm would be extremely ponderous and expensive.

Properly designed equipment of this type must withstand minor pressure fluctuations but must rupture and relieve any rapid pressure increase almost immediately. Also, once a rupture is accomplished, the complete opening of the device must be such as to allow relieving of any pressure increase. The foregoing requirements for explosion pressure relief devices eliminate the possible use of relief valves of the spring-loaded or poppet type.

Thus the principal object of this invention is to provide a safety pressure relieving device which will satisfactorily protect systems and vessels from explosion damage.

A further object of this invention is to provide a safety pressure relief device which is economically feasible to manufacture in the sizes necessary.

A still further object of this invention is to provide a safety pressure relief device which will withstand pressure differentials in one direction (external pressure) and will rupture and provide adequate relieving where the pressure differential is suddenly reversed as in an internal explosion.

A still further object of this invention is to provide a safety pressure relief device comprising a plurality of frangible sealing elements.

Another object of this invention is to provide a safety pressure relief device which is easily adaptable to any shape of relieving area.

In accomplishing these and other objects of the invention, I have provided improved details of structure, the preferred form of which is illustrated in the accompanying drawing wherein:

Fig. 4 is a sectional view taken along a diameter of the device illustrating its installation and relief opening.

Fig. 5 is a perspective view of a set of parts of the device shown in disassembled spaced relation.

Fig. 6 is a partial perspective view of a form of support for the device.

Figure 1:
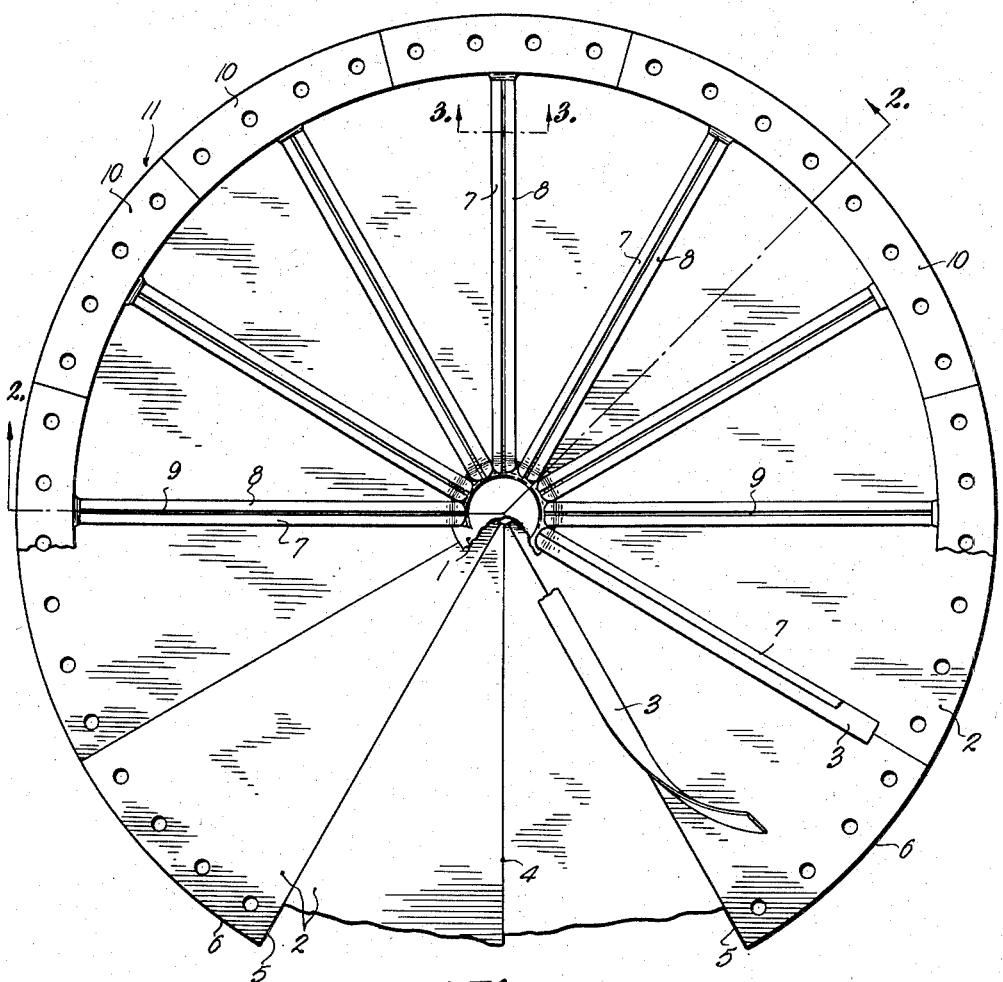
Fig. 1 is a plan view with some elements removed to illustrate the detailed construction of a device embodying the features of the present invention.

Referring more in detail to the drawing:

A frangible sealing member 1 is positioned upon the upper and central surfaces of a plurality of circular sector-shaped base elements 2. Frangible sealing strips 3 cover the spaces 4 formed between contiguous edges 5 of the base elements 2. These strips 3 extend radially from a central position overlapping the frangible sealing member 1 and terminate short of the arcuate edges 6 of the base elements 2.

Stiffening strips 7 and 8 rest on the sealing strips 3 and are spaced apart and parallel to each other forming a space 9 which is above the space 4 with only the sealing strip 3 separating the spaces.

Figure 2:
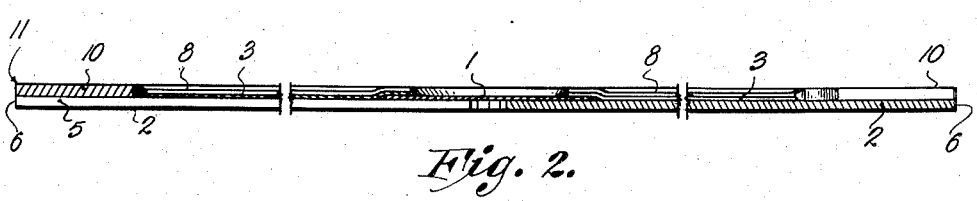
Fig. 2 is a sectional view taken along line 2—2 in Fig. 1 with breaks at intermediate points between the outer and inner portions of the device.
Figure 3:
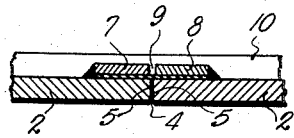
Fig. 3 is a sectional view taken along line 3—3 in Fig. 1.

The frangible sealing strips 3, the stiffening strips 7 and 8 and the frangible sealing member 1 are silver soldered or otherwise secured to the base elements 2 as shown in Figs. 2 and 3, forming a structure which is sealed thereby.

Annular clamping elements 10, on the base elements 2, form a flange ring 11. Additional silver soldering is required to seal the remainder of space 4 which is beyond the outermost extension of the sealing strips 3.

An accurate perception of the relative sizes of the components of this device will be aided by the following example. In a device of this type which is designed to give a relief opening of approximately nine feet in diameter, the thickness of the sealing member 1 and sealing strips 3 is approximately five thousandths of an inch and the approximate thickness of the base elements 2 and flange ring 11 would be only eighteen thousandths of an inch. This extreme thinness of components is required to give a low differential bursting pressure and also to facilitate the complete opening of the device as shown in Fig. 4. This opening is accomplished by a failure and tearing of the sealing member 1 and the sealing strips 3 above the spaces 4. The sealing member 1 will fracture in a manner so that each part will remain attached to the portion of the base element 2 to which it was originally secured. The tearing of the strips 3 will be above the spaces 4 and each part will remain in position on the base element 2 with its respective stiffening strip 7 or 8.

Fig. 4 also illustrates the installation of the device on the support 12. The vessel or system to be protected (not shown) is provided with a cylindrical duct 13 surrounding the relief area 14. This duct 13 terminates upwardly in a flange 15. The support 12 is positioned in the relief area 14 on a supporting recessed ledge 16 of the flange 15. The device is secured in position on the flange 15 and the support 12 and bolted by bolts 17 and nuts 18 or otherwise secured. It is often necessary that a gasket material 19 be used to completely seal the relief area 14.

Fig. 5 illustrates the overlying relationship of the sealing member 1, the sealing strip 3 and the annular clamping element 10 to the base elements 2. Also the stiffening strips 7 and 8 are shown above the sealing strip 3.

The detail construction of a type of support 12 is shown in Fig. 6. The support 12 consists of flat bar stock pieces welded or otherwise secured to each other to form a grid-type structure wherein the vertical dimension of the pieces is much the greater. Thus the support offers sufficient strength but does not block the relief area any more than is necessary to obtain adequate supporting of the relief device.

In operation, the explosion relieving device is positioned on the flange 15 as previously explained herein. The system to be protected may be put into service. Thus under normal operating conditions the device rests upon the support 12 and any external pressure differential will only hold the device tightly on the support 12 and flange 15 sealing the relief area 14. Assuming that an explosion occurs, the pressure differential is suddenly reversed so that internal system pressures are higher than the external pressures. This new pressure differential tends to move the structure away from the support 12, causing a tension in the frangible sealing member 1 and the frangible sealing strips 3. If the internal pressure continues to increase as it would in an explosion, the ultimate strength of the member 1 and the strips 3 will be surpassed causing a rupture. With the complete failure of these frangible elements, the base elements 2 are released and the pressure causes them to bend upwardly and outwardly until complete opening as shown in Fig. 4 is accomplished. With such an opening further internal pressure increases are not possible and any internal pressure build-up which was needed for the rupturing of the device will be immediately dissipated.

Thus it may be seen that this embodiment of the present invention will function to provide the requisite relief opening for preventing explosion damage.

The gauge of sheet material used in making the frangible member 1 and the frangible strips 3 may be varied to change the pressure at which the device will rupture, keeping in mind the tensile strength of the material. Therefore, if the pressure at which the device is designed to rupture would damage the system, then a lighter gauge material would be used in making the frangible elements 1 and 3. Conversely, if the system can safely withstand higher pressures and higher operating pressures were desired, a heavier gauge material should be used.

It is obvious that the present invention is easily adaptable to any relief area shape so long as it allows the use of base elements in conjunction with sealing members and sealing strips.

What I claim and desire to secure by Letters Patent is:

1. A safety pressure relief device comprising, a plurality of segment members, said segment members each being triangular shaped and positioned with respect to each other segment member to form a substantially flat structure having radial slots and a central opening, a plurality of frangible strips, each of said frangible strips positioned in covering relationship to one of said radial slots between said segment members, a frangible disc positioned in covering relationship to said central opening, means securing said frangible strips and said frangible disc in sealing relationships to said segment members.

2. Invention according to claim 1 including, a plurality of reinforcing strips, two of said strips being positioned on each of said frangible strips.

3. Invention according to claim 2 wherein said segment members are sufficiently sized to resist rupture failure and to allow bending failure upon rupture of said frangible strips and said frangible disc.

References Cited in the file of this patent

UNITED STATES PATENTS

| | | |
|---|---|---|
| 1,250,680 | Sheldon | Dec. 18, 1917 |
| 1,455,582 | Ford | May 15, 1923 |
| 2,123,662 | Raymond | July 12, 1938 |
| 2,209,399 | Hall | July 30, 1940 |
| 2,261,035 | Miller | Oct. 28, 1941 |
| 2,523,068 | Simpson et al. | Sept. 19, 1950 |
| 2,548,744 | Simms | Apr. 10, 1951 |
| 2,656,950 | Coffman | Oct. 27, 1953 |